United States Patent
Rickard et al.

(10) Patent No.: US 9,773,577 B2
(45) Date of Patent: Sep. 26, 2017

(54) IRRADIATION TARGETS FOR ISOTOPE DELIVERY SYSTEMS

(75) Inventors: David Allan Rickard, Wilmington, NC (US); Bradley Bloomquist, Wilmington, NC (US); Melissa Allen, Wilmington, NC (US); Nicholas R. Gilman, Broomfield, CO (US); Jennifer M. Bowie, Leland, NC (US); William Earl Russell, II, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 2521 days.

(21) Appl. No.: 12/547,282

(22) Filed: Aug. 25, 2009

(65) Prior Publication Data

US 2011/0051872 A1    Mar. 3, 2011

(51) Int. Cl.
*G21G 1/02* (2006.01)
(52) U.S. Cl.
CPC ..................................... *G21G 1/02* (2013.01)
(58) Field of Classification Search
USPC ........................................ 376/202, 189, 340
See application file for complete search history.

(56) References Cited

U.S. PATENT DOCUMENTS

| | | |
|---|---|---|
| 3,594,275 A | 7/1971 | Ransohoff et al. |
| 3,773,615 A * | 11/1973 | Blatter ................ 376/202 |
| 3,879,612 A | 4/1975 | Foster et al. |
| 3,940,318 A | 2/1976 | Arino et al. |
| 3,998,691 A | 12/1976 | Shikata et al. |
| 4,196,047 A | 4/1980 | Mitchem et al. |
| 4,284,472 A | 8/1981 | Pomares et al. |
| 4,462,956 A | 7/1984 | Boiron et al. |

(Continued)

FOREIGN PATENT DOCUMENTS

| | | |
|---|---|---|
| CA | 2653871 A1 | 8/2009 |
| JP | 36-007990 | 6/1961 |

(Continued)

OTHER PUBLICATIONS

Swedish Office Action dated May 11, 2011 issued in connection with correspondg SE Application No. 1050864-6 together with unofficial English translation.

(Continued)

*Primary Examiner* — Sean P Burke
(74) *Attorney, Agent, or Firm* — Harness, Dickey & Pierce P.L.C.

(57) ABSTRACT

Example embodiments are directed to methods of producing desired isotopes in commercial nuclear reactors and associated apparatuses using instrumentation tubes conventionally found in nuclear reactor vessels to expose irradiation targets to neutron flux found in the operating nuclear reactor. Example embodiments include irradiation targets for producing radioisotopes in nuclear reactors and instrumentation tubes thereof. Example embodiments include one or more irradiation targets useable with example delivery systems that permit delivery into instrumentation tubes. Example embodiments may be sized, shaped, fabricated, and otherwise configured to successfully move through example delivery systems and conventional instrumentation tubes while producing desired isotopes.

8 Claims, 11 Drawing Sheets

(56) References Cited

U.S. PATENT DOCUMENTS

| | | | |
|---|---|---|---|
| 4,475,948 A | 10/1984 | Cawley et al. |
| 4,493,813 A | 1/1985 | Loriot et al. |
| 4,532,102 A | 7/1985 | Cawley |
| 4,597,936 A | 7/1986 | Kaae |
| 4,617,985 A | 10/1986 | Triggs et al. |
| 4,663,111 A | 5/1987 | Kim et al. |
| 4,729,903 A | 3/1988 | McGovern et al. |
| 4,782,231 A | 11/1988 | Svoboda et al. |
| 4,859,431 A | 8/1989 | Ehrhardt |
| 5,053,186 A | 10/1991 | Vanderheyden et al. |
| 5,145,636 A | 9/1992 | Vanderheyden et al. |
| 5,355,394 A | 10/1994 | Van Geel et al. |
| 5,400,375 A | 3/1995 | Suzuki et al. |
| 5,513,226 A | 4/1996 | Baxter et al. |
| 5,596,611 A | 1/1997 | Ball |
| 5,615,238 A | 3/1997 | Wiencek et al. |
| 5,633,900 A | 5/1997 | Hassal |
| 5,682,409 A | 10/1997 | Caine |
| 5,758,254 A | 5/1998 | Kawamura et al. |
| 5,867,546 A | 2/1999 | Hassal |
| 5,871,708 A | 2/1999 | Park et al. |
| 5,910,971 A | 6/1999 | Ponomarev-Stepnoy et al. |
| 6,056,929 A | 5/2000 | Hassal |
| 6,160,862 A | 12/2000 | Wiencek et al. |
| 6,192,095 B1 | 2/2001 | Sekine et al. |
| 6,233,299 B1 | 5/2001 | Wakabayashi |
| 6,456,680 B1 | 9/2002 | Abalin et al. |
| 6,678,344 B2 | 1/2004 | O'Leary et al. |
| 6,751,280 B2 | 6/2004 | Mirzadeh et al. |
| 6,804,319 B1 | 10/2004 | Mirzadeh et al. |
| 6,895,064 B2 | 5/2005 | Ritter |
| 6,896,716 B1 | 5/2005 | Jones, Jr. |
| 7,157,061 B2 | 1/2007 | Meikrantz et al. |
| 7,235,216 B2 | 6/2007 | Kiselev et al. |
| 2002/0034275 A1 | 3/2002 | Abalin et al. |
| 2003/0012325 A1 | 1/2003 | Kernert et al. |
| 2003/0016775 A1 | 1/2003 | Jamriska, Sr. et al. |
| 2003/0103896 A1 | 6/2003 | Smith |
| 2003/0179844 A1 | 9/2003 | Filippone |
| 2003/0227991 A1* | 12/2003 | Kang et al. ............ 376/202 |
| 2004/0091421 A1 | 5/2004 | Aston et al. |
| 2004/0105520 A1 | 6/2004 | Carter |
| 2004/0196942 A1 | 10/2004 | Mirzadeh et al. |
| 2004/0196943 A1 | 10/2004 | Di Caprio |
| 2005/0105666 A1 | 5/2005 | Mirzadeh et al. |
| 2005/0118098 A1 | 6/2005 | Vincent et al. |
| 2005/0286675 A1* | 12/2005 | Kang et al. ............ 376/342 |
| 2006/0062342 A1 | 3/2006 | Gonzalez Lepera et al. |
| 2006/0126774 A1 | 6/2006 | Kim et al. |
| 2007/0133731 A1 | 6/2007 | Fawcett et al. |
| 2007/0133734 A1 | 6/2007 | Fawcett et al. |
| 2007/0297554 A1 | 12/2007 | Lavie et al. |
| 2008/0031811 A1 | 2/2008 | Ryu et al. |
| 2008/0076957 A1 | 3/2008 | Adelman |

FOREIGN PATENT DOCUMENTS

| | | |
|---|---|---|
| JP | 50-58494 | 5/1975 |
| JP | 59-120894 | 7/1984 |
| TW | 436814 | 5/2001 |
| TW | 200625344 | 7/2006 |

OTHER PUBLICATIONS

Oct. 1, 2014 Taiwanese Office Action issued in corresponding TW Application No. 099127177 (translation).

Sep. 2, 2014 Japanese Office Action issued in corresponding JP Application No. 2010-185695 (with translation).

* cited by examiner

IRRADIATION TARGETS FOR ISOTOPE DELIVERY SYSTEMS

BACKGROUND

Field

Example embodiments generally relate to isotopes and apparatuses and methods for production thereof in nuclear reactors.

Description of Related Art

Radioisotopes have a variety of medical and industrial applications stemming from their ability to emit discreet amounts and types of ionizing radiation and form useful daughter products. For example, radioisotopes are useful in cancer-related therapy, medical imaging and labeling technology, cancer and other disease diagnosis, and medical sterilization.

Radioisotopes having half-lives on the order of days are conventionally produced by bombarding stable parent isotopes in accelerators or low-power reactors with neutrons on-site at medical or industrial facilities or at nearby production facilities. These radioisotopes are quickly transported due to the relatively quick decay time and the exact amounts of radioisotopes needed in particular applications. Further, on-site production of radioisotopes generally requires cumbersome and expensive irradiation and extraction equipment, which may be cost-, space-, and/or safety-prohibitive at end-use facilities.

Because of difficulties with production and the lifespan of short-term radioisotopes, demand for such radioisotopes may far outweigh supply, particularly for those radioisotopes having significant medical and industrial applications in persistent demand areas, such as cancer treatment.

SUMMARY

Example embodiments are directed to methods of producing desired isotopes in commercial nuclear reactors and associated irradiation targets. Example methods may utilize instrumentation tubes conventionally found in nuclear reactor vessels to expose irradiation targets to neutron flux found in the operating nuclear reactor. Desired isotopes may be produced in the irradiation targets due to the flux. These desired isotopes may then be relatively quickly and simply harvested by removing the irradiation targets from the instrumentation tube and reactor containment, without shutting down the reactor or requiring chemical extraction processes. The produced isotopes may then be immediately transported to end-use facilities.

Example embodiments include irradiation targets for use in nuclear reactors and instrumentation tubes thereof. Example embodiments may include one or more irradiation targets useable with example delivery systems that permit delivery of irradiation targets. Example embodiments may be sized, shaped, fabricated, and otherwise configured to successfully move through example delivery systems and conventional instrumentation tubes.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially and concurrently or may sometimes be executed in the reverse order, depending upon the functionality/acts involved.

Figure 1:
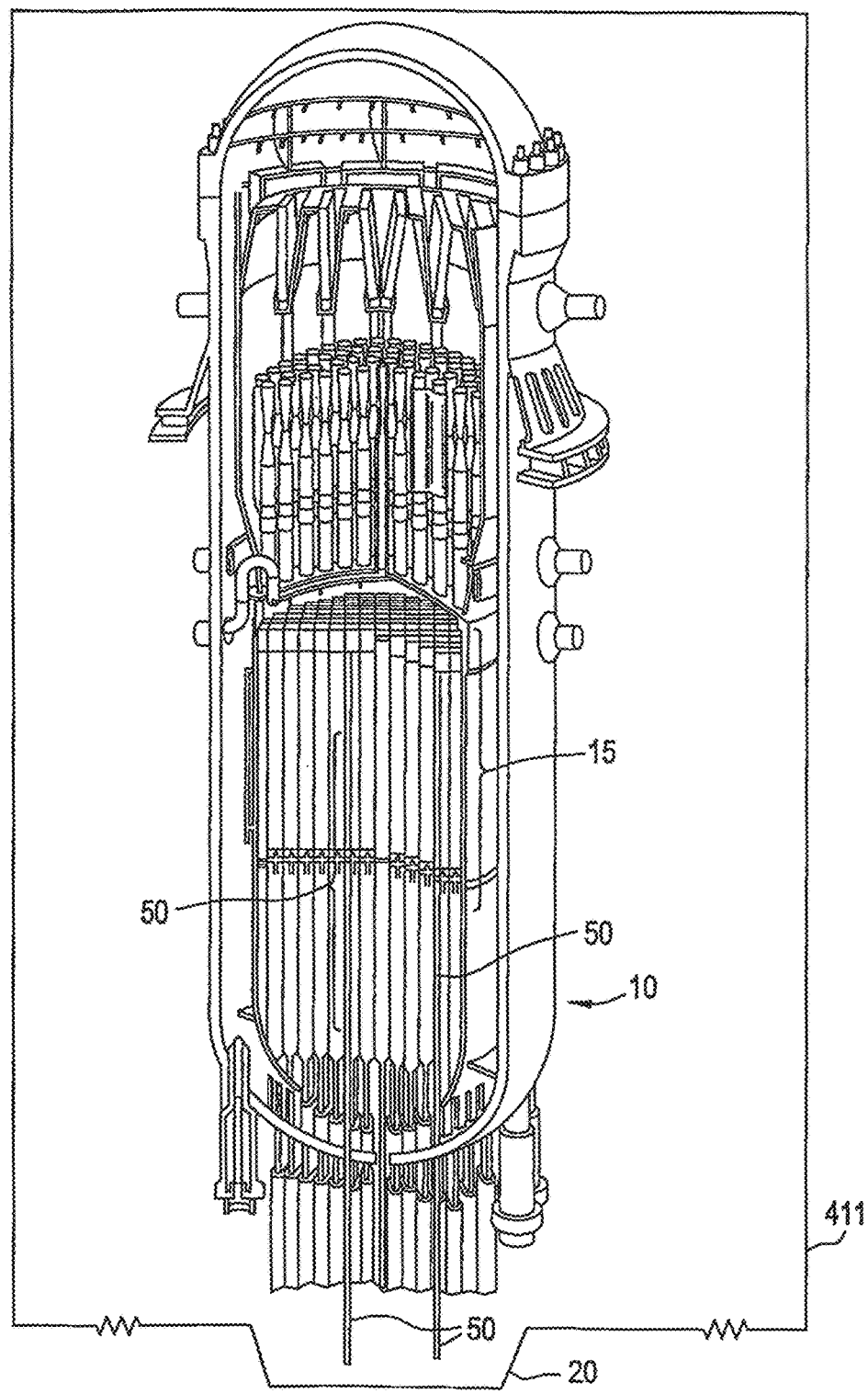
FIG. 1 is an illustration of a conventional nuclear reactor having a plurality of instrumentation tubes.

FIG. 1 is an illustration of a conventional reactor pressure vessel 10 usable with example embodiments and example methods. Reactor pressure vessel 10 may be used in at least a 100 MWe commercial light water nuclear reactor conventionally used for electricity generation throughout the world. Reactor pressure vessel 10 may be positioned within a containment structure 411 that serves to contain radioactivity in the case of an accident and prevent access to reactor pressure vessel 10 during operation of the reactor pressure vessel 10. A cavity below the reactor pressure vessel 10, known as a drywell 20, serves to house equipment servicing the vessel such as pumps, drains, instrumentation tubes, and/or control rod drives. As shown in FIG. 1, at least one instrumentation tube 50 extends vertically into the reactor pressure vessel 10 and well into or through core 15 containing nuclear fuel and relatively high amounts of neutron flux during operation of the core 15. Instrumentation tubes 50 may be generally cylindrical and widen with height of the reactor pressure vessel 10; however, other instrumentation tube geometries are commonly encountered in the industry. An instrumentation tube 50 may have an inner diameter and/or clearance of about 0.3 inch, for example.

The instrumentation tubes 50 may terminate below the reactor pressure vessel 10 in the drywell 20. Conventionally, instrumentation tubes 50 may permit neutron detectors, and other types of detectors, to be inserted therein through an opening at a lower end in the drywell 20. These detectors may extend up through instrumentation tubes 50 to monitor conditions in the core 15. Examples of conventional monitor types include wide range detectors (WRNM), source range monitors (SRM), intermediate range monitors (IRM), and/or Local Power Range Monitors (LPRM).

Although reactor pressure vessel 10 is illustrated with components commonly found in a commercial Boiling Water Reactor, example embodiments and methods may be useable with several different types of reactors having instrumentation tubes 50 or other access tubes that extend into the reactor. For example, Pressurized Water Reactors, Heavy-Water Reactors, Graphite-Moderated Reactors, etc. having a power rating from below 100 Megawatts-electric to several Gigawatts-electric and having instrumentation tubes 50 at several different positions from those shown in FIG. 1 may be useable with example embodiments and methods. As such, instrumentation tubes 50 useable in example methods may be any protruding feature at any geometry about the core 15 that allows enclosed access to the flux of the nuclear core of various types of reactors.

Applicants have recognized that instrumentation tubes 50 may be useable to quickly and constantly generate desired isotopes on a large-scale basis without the need for chemical or isotopic separation and/or waiting for reactor shutdown of commercial reactors. Example methods may include inserting irradiation targets into instrumentation tubes 50 and exposing the irradiation targets to the core 15 while operating, thereby exposing the irradiation targets to the neutron flux commonly encountered in the operating core 15. The core flux may convert a substantial portion of the irradiation targets to a useful radioisotope, including short-term radioisotopes useable in medical applications. Irradiation targets may then be withdrawn from the instrumentation tubes 50, even during ongoing operation of the core 15, and removed for medical and/or industrial use.

Example Delivery Systems

Example delivery systems are discussed below in conjunction with example embodiment irradiation targets useable therewith, which are described in detail later. It is understood that example embodiment irradiation targets may be useable with other types of delivery systems than those described below.

FIGS. 2-6 are illustrations of related systems for delivering example embodiment irradiation targets into a nuclear reactor, described in co-pending application Ser. No. 12/547,249, filed on the same date herewith, entitled "CABLE DRIVEN ISOTOPE DELIVERY SYSTEM," the contents of which are herein incorporated by reference in their entirety. Example embodiment irradiation target retaining apparatuses are useable with the related systems described in FIGS. 2-6; however, it is understood that other delivery systems may be used with example embodiment irradiation target retaining apparatuses.

Figure 2:
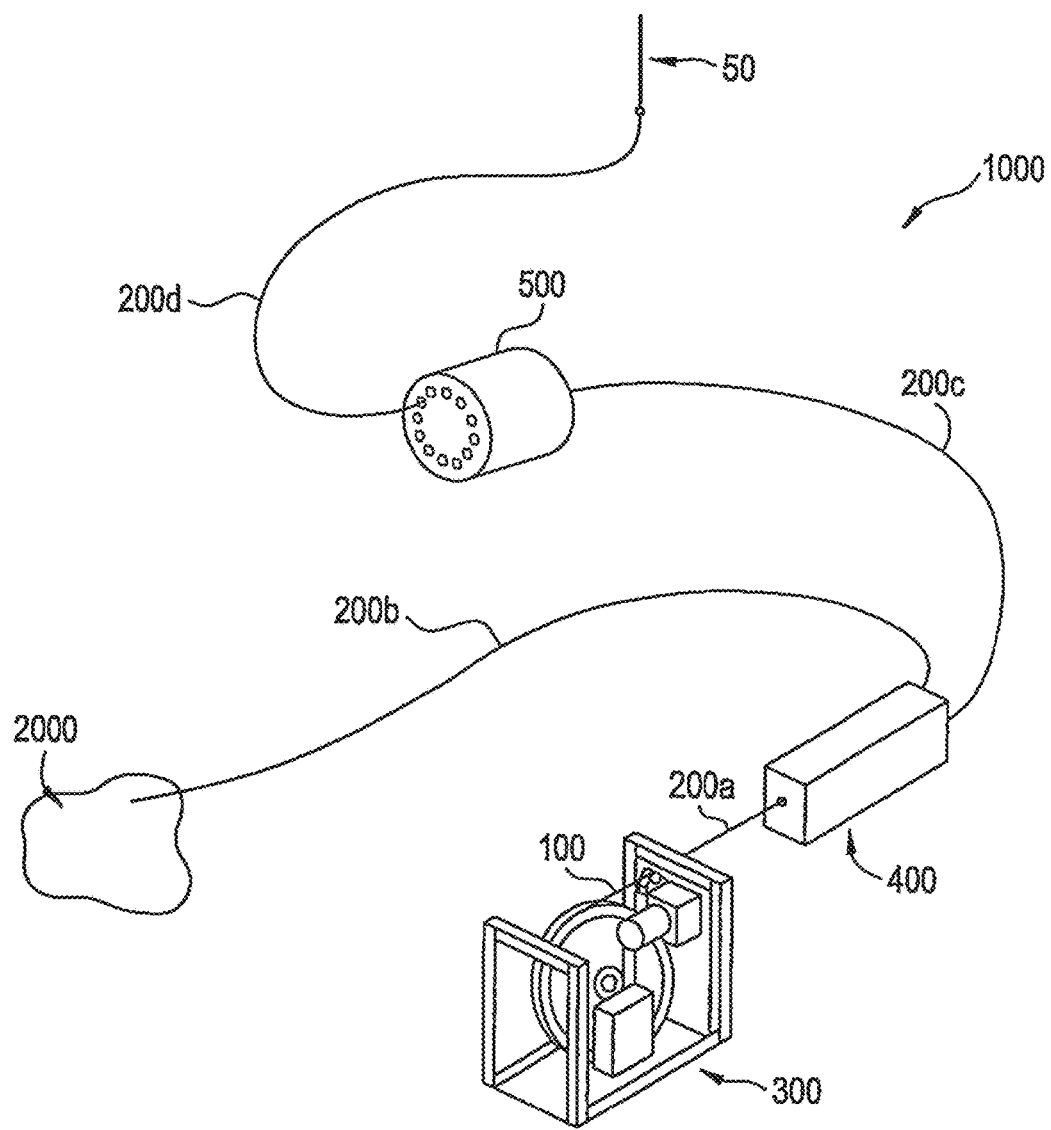
FIG. 2 is an illustration of an example embodiment system for delivering example embodiments into an instrumentation tube of a nuclear reactor.

FIG. 2 illustrates a related cable-driven isotope delivery system 1000 that may use the instrument tubes 50 to deliver example embodiment irradiation targets into a reactor pressure vessel 10 (FIG. 1). Cable driven isotope delivery system 1000 may be capable of transferring an irradiation target from a loading/unloading area 2000, to an instrumentation tube 50 of reactor pressure vessel 10 and/or from instrumentation tube 50 of the reactor pressure vessel 10 to the loading/unloading area 2000. As shown in FIG. 2, cable driven isotope delivery system 1000 may include a cable 100, tubing 200a, 200b, 200c, and 200d, a drive mechanism 300, a first guide 400, and/or a second guide 500. The tubing 200a, 200b, 200c, and 200d may be sized and configured to allow the cable 100 to slide therein. Accordingly, the tubing 200a, 200b, 200c, and 200d may act to guide the cable 100 from one point in the cable driven isotope delivery system 1000 to another point in the cable driven isotope delivery system 1000. For example, tubing 200a, 200b, 200c, and 200d may guide cable 100 from a point outside of containment structure 411 (FIG. 1) to a point in instrumentation tube 50 inside containment structure 411.

Figure 3:
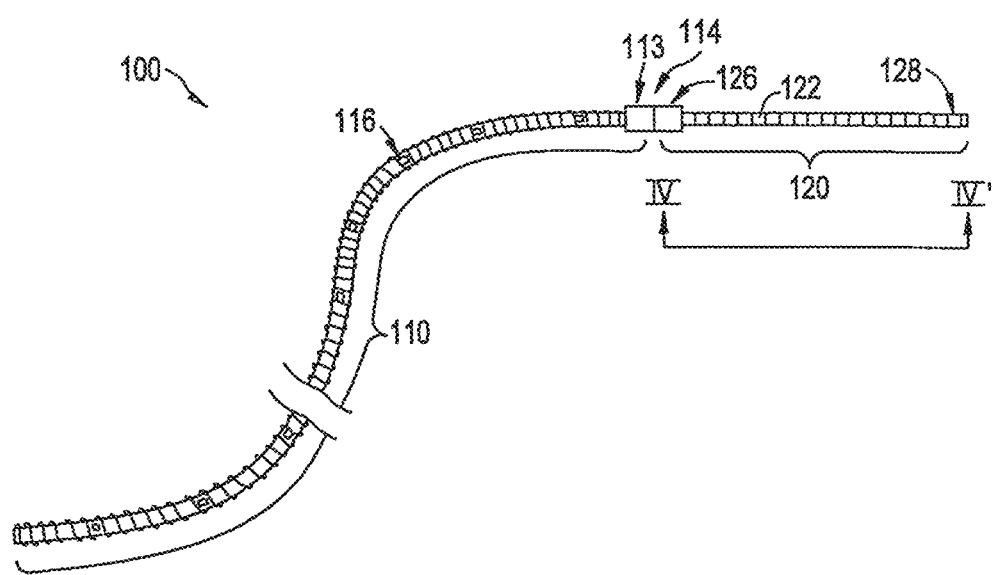
FIG. 3 is a detail view of the example embodiment system of FIG. 2.
Figure 4:
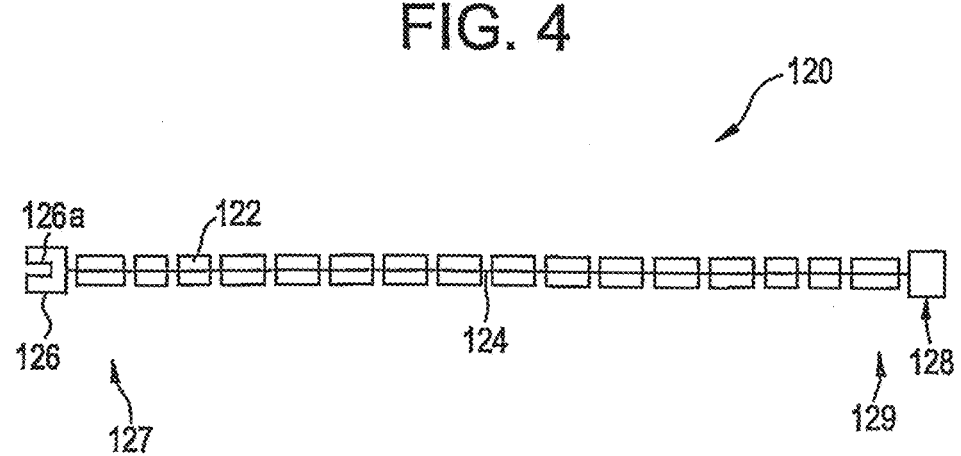
FIG. 4 is a detail view of the example embodiment system of FIG. 3.

An example cable 100 is illustrated in FIGS. 3 and 4. Example cable 100 may have at least two portions: 1) a relatively long driving portion 110; and 2) a target portion 120. Driving portion 110 of cable 100 may be fabricated of a material having a low nuclear cross-section, such as aluminum, silicon, and/or stainless steel. Driving portion 110 of cable 100 may be braided in order to increase the flexibility and/or strength of cable 100 so that cable 100 may be more easily bendable and capable of being wrapped around a reel, for example. Although cable 100 may be easily bendable, cable 100 may additionally be sufficiently stiff in an axial direction so that cable 100 may be pushed through tubing 200a, 200b, 200c, and/or 200d without buckling.

As shown in FIG. 4, target portion 120 of example cable 100 may include a plurality of example embodiment irradiation targets 122. Target portion 120 may be attached to a first end 114 of the driving portion 110. The length of the target portion 120 may vary depending on a number of factors, including the irradiation target material, the size and shape of the example embodiment irradiation targets 122, the amount of radiation the target is expected to be exposed to, and/or the geometry of the instrument tubes 50. As an example, the target portion 120 may be about 12 feet long.

Referring to FIGS. 3-4, target portion 120 may include a first end cap 126 at a first end 127 of target portion 120 and a second end cap 128 at a second end 129 of target portion 120. First end cap 126 may be configured to attach to a first end 114 of driving portion 110. First end cap 126 and first end 114 of driving portion 110 may form a quick connect/disconnect connection. For example, first end cap 126 may include a hollow portion having internal threads 126a. First end 114 of driving portion 110 may include a connector 113 having external threads that may be configured to mesh with the internal threads 126a of the first end cap 126. Although the example connection illustrated in FIGS. 3 and 4 is described as a threaded connection, one skilled in the art would recognize various other methods of connecting target portion 120 of the cable 100 to driving portion 110 of cable 100.

An operator may configure first guide 400 and second guide 500 so that cable 100 may be advanced to a desired destination. For example, between loading/unloading area 2000 and instrumentation tube 50.

After configuring first and second guides 400 and 500, an operator may operate drive system 300 to advance cable 100 through tubing 200a, first guide 400, and second tubing 200b to place first end 114 of driving portion 110 of cable 100 into the loading/unloading area 2000. An operator may advance cable 100 by controlling a worm gear in drive system 300 that meshes with cable 100. The location of first end 114 of driving portion 110 of cable 100 may be tracked via markings 116 on cable 100. In the alternative, position of first end 114 of driving portion 110 of cable 100 may be known from information collected from a transducer that may be connected to drive system 300.

After the cable 100 has been positioned in the loading/unloading area 2000 example embodiment irradiation targets 122 may then be connected to cable 100 as described below with reference to example embodiment irradiation targets. An operator may operate drive system 300 to pull the cable from the loading/unloading area 2000 through tubing 200b and through first guide 400. The operator may then reconfigure first guide 400 to send cable 100 and example embodiment irradiation targets 122 to reactor pressure vessel 10. After the first guide 400 is reconfigured, the operator may advance cable 100 through third tubing 200c, second guide 500, fourth tubing 200d, and into a desired instrumentation tube 50. Location of first end 114 of the driving portion 110 of cable 100 may be tracked via markings 116 on cable 100. In the alternative, position of first end 114 of driving portion 110 of cable 100 may be known from information collected from a transducer that may be connected to a worm gear, for example.

After cable 100 bearing example embodiment irradiation targets 122 has been advanced to the appropriate location within instrumentation tube 50, the operator may stop cable 100 in the instrumentation tube 50. At this point, irradiation targets 122 may be irradiated for the proper time in the nuclear reactor. After irradiation, the operator may operate drive system 300 to pull cable 100 out of instrumentation tube 50, fourth tubing 200d, second guide 500, third tubing 200c, and/or first guide 400.

An operator may operate drive system 300 to advance cable 100 through first guide 400, and second tubing 200b to place first end 114 of driving portion of the cable 100 and example embodiment irradiation targets 122 into the loading/unloading area 2000. Example irradiation targets 122 may be removed from cable 100 and stored in a transfer cask or another desired location. An example transfer cask may be made of lead, tungsten, and/or depleted uranium in order to adequately shield the irradiated targets 122. Attachment and detachment of example embodiment irradiation targets 122 may be facilitated by the use of cameras which may be placed in the loading/unloading area 2000 to allow an operator to visually inspect the equipment during operation.

Figure 5:
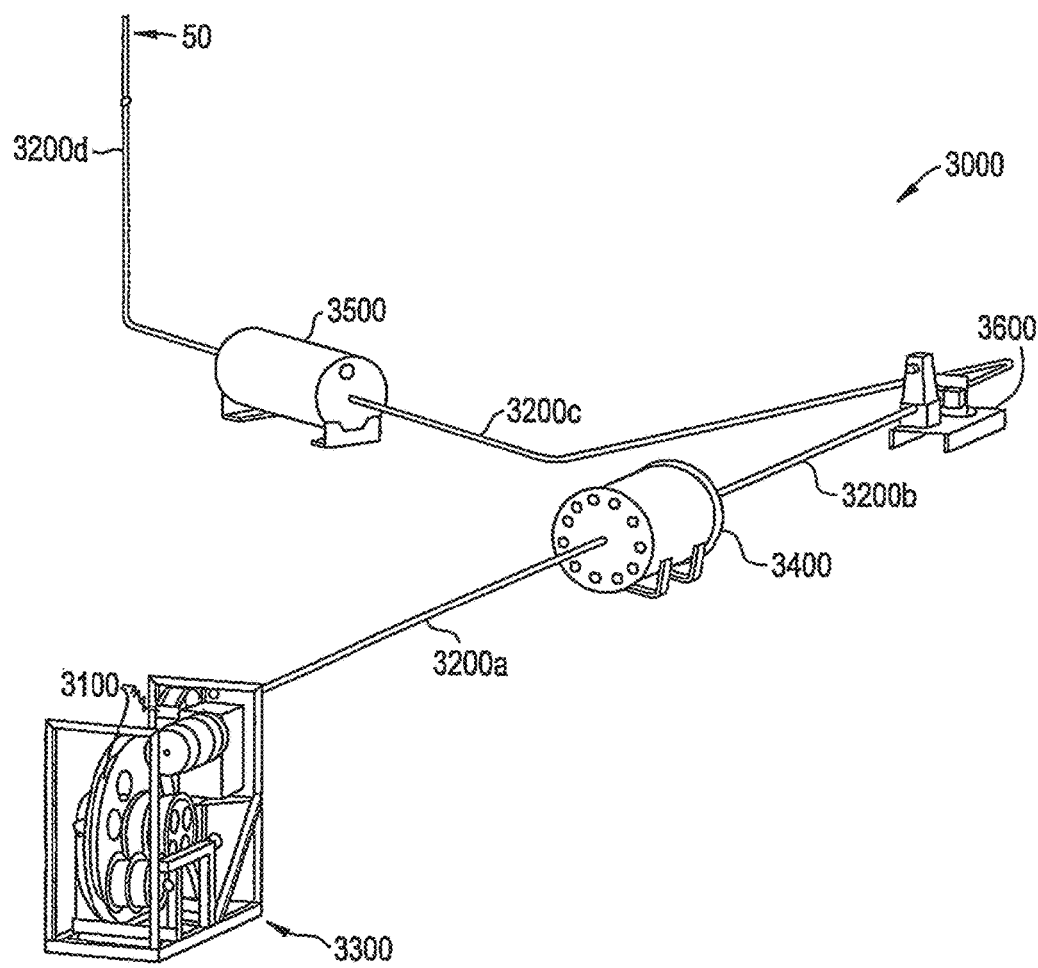
FIG. 5 is an illustration of a conventional nuclear reactor TIP system.

An alternate delivery system includes use of a conventional Transverse In-core Probe (TIP) system. A conventional TIP system 3000 is illustrated in FIG. 5. As shown in FIG. 5, TIP system 3000 may include a drive system 3300 for driving a cable 3100, and tubing 3200a between drive system 3300 and a chamber shield 3400, tubing 3200b between chamber shield 3400 and a valve 3600, tubing 3200c between valve 3600 and a guide 3500, and tubing 3200d between guide 3500 and an instrumentation tube 50. Cable 3100 may be similar to the cable 100 described with reference to FIGS. 2-4. Guide 3500 of conventional TIP system 3000 may guide a TIP sensor to a desired instrumentation tube 50. Chamber shield 3400 may resemble a barrel filled with lead pellets. The chamber shield 3400 may store the TIP sensor when not utilized in the reactor pressure vessel 10. Valves 3600 are a safety feature utilized with the TIP system.

Because the TIP system includes a tubing system 3200a, 3200b, 3200c, and 3200d and/or a guide 3500 for guiding a cable 100 into an instrumentation tube 50, these systems may be used as an example delivery mechanism for example embodiment irradiation targets 122.

Figure 6:
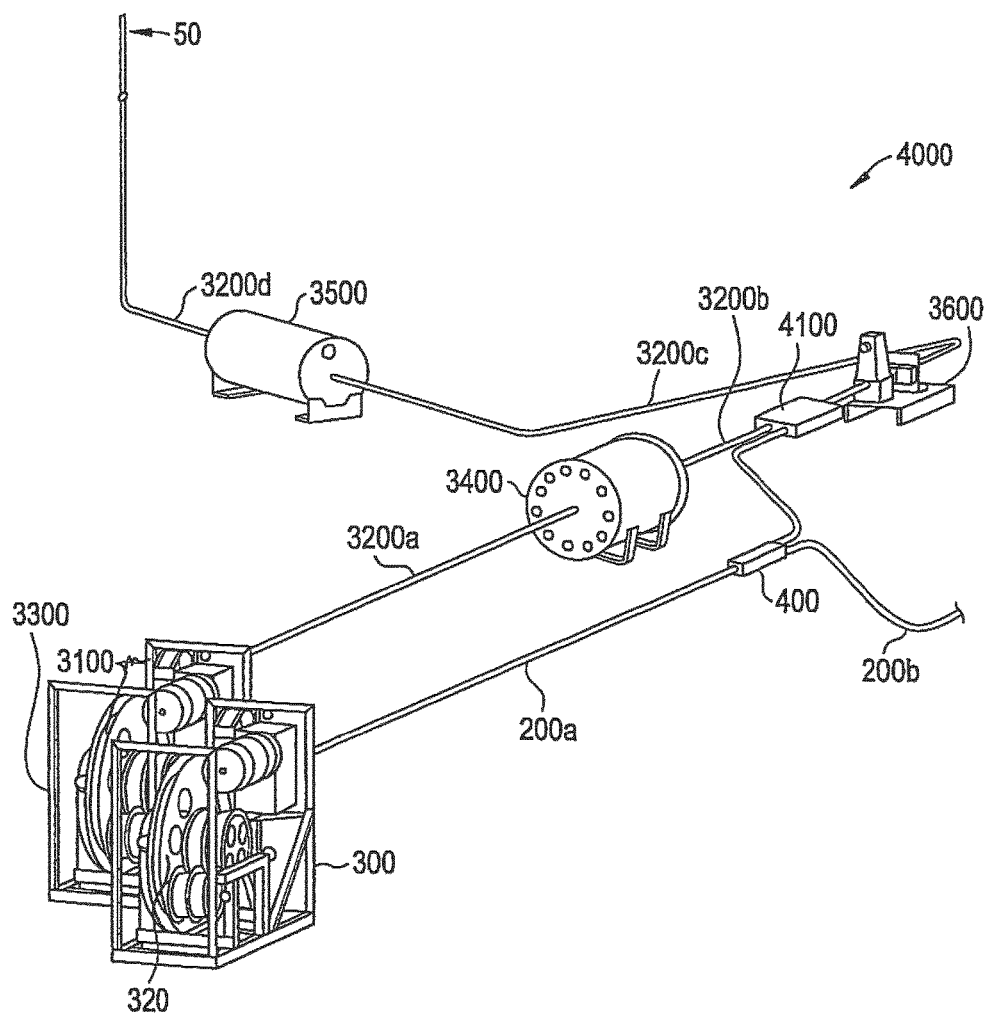
FIG. 6 is an illustration of a further example embodiment system for delivering example embodiments into an instrumentation tube of a nuclear reactor.

FIG. 6 illustrates an example delivery system including a modified TIP system 4000. As shown in FIG. 6, the modified TIP system 4000 is similar to conventional TIP system 3000 illustrated in FIG. 5, with a guide 4100 introduced between chamber shield wall 3400 and valves 3600 of the conventional TIP system 3000. Guide 4100 may serve as an access point for introducing a cable, for example, cable 100, into modified TIP system 4000. As shown in FIG. 6, drive system 300 (FIG. 2) may be placed in parallel with drive system 3300 of the modified TIP system 4000. Drive system 300 may include cable storage reel 320 on which cable 100 may be wrapped. Tube 200a may extend from the drive system 3300 to guide 400 which may direct cable 100 to a desired location. Rather than having an exit point that may direct cable 100 to second guide 500 (FIG. 2), first guide 400 in modified TIP system 4000 may be configured to direct cable 100 to guide 4100 instead. In this way, the first guide 400 may guide cable 100 into the modified TIP system 4000 tubing via guide 4100.

Cable 100 should be sized to function with existing tubing in example delivery systems and permit passage of example embodiment irradiation targets 122. For example, the inner diameter of tubing 3200a, 3200b, etc. may be approximately 0.3 inches. Accordingly, cable 100 may be sized so that dimensions transverse to the cable 100 do not exceed 0.3 inches.

Example Embodiment Irradiation Targets

Example delivery systems being described, example embodiment irradiation targets useable therewith are now described. It is understood that example targets devices may be configured/sized/shaped/etc. to interact with the example delivery systems discussed above, but example targets may also be used in other delivery systems and methods in order to be irradiated within a nuclear reactor.

Figure 7:
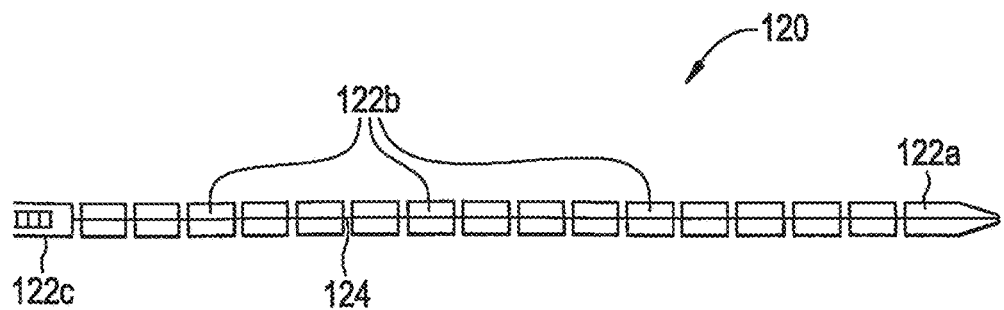
FIG. 7 is an illustration of several example embodiment irradiation targets combined with example delivery systems.

FIG. 7 is an illustration of example embodiment irradiation targets 122a, 122b, and 122c. As shown in FIG. 7, irradiation targets 122a, b, and c may be useable with and/or replace some features shown in FIG. 4 in connection with example delivery devices discussed above. Particularly, target portion 120 may contain example embodiment irradiation target 122a in place of second endcap 128 at an end of target portion 120. Target portion 120 may further contain example embodiment irradiation target 122c in place of first end 127 having endcap 126 with internal threads 126a for connection to driving portion 110 (FIG. 3). Alternatively, second endcap 128 and/or first endcap 126 may be present and useable with example embodiment irradiation targets 122a, 122b, and 122c.

Individual example irradiation targets 122a, 122b, and 122c are discussed below with reference to FIGS. 8-10. The various example embodiments, 122a, 122b, 122c, may each be fabricated of or contain one or more materials that convert to desired daughter products when exposed to nuclear flux. An irradiation target is a target that is irradiated for the purpose of generating radioisotopes. Accordingly, sensors, which may be irradiated by a nuclear reactor and which may generate radioisotopes, do not fall within the scope of term target as used herein since their purpose is to detect the state of the reactor rather than to generate radioisotopes.

Materials for irradiation targets 122a, 122b, and 122c and amount of exposure time in instrumentation tube 50 may be selected to determine the type and concentration of radioisotope produced. That is, because axial flux levels are known within an operating reactor, and because example embodiments may permit precise control of axial position of irradiation targets 122 used in example delivery apparatuses, the type and size of irradiation targets 122 and exposure time may be used to determine the resulting radioisotopes and their strength. It is known to one skilled in the art and from reference to conventional decay and cross-section charts what types of irradiation targets 122 will produce desired radioisotopes given exposure to a particular amount of neutron flux. Further, irradiation targets 122 may be chosen based on their neutron cross-section, so as to beneficially affect or not interfere with neutron flux at known axial positions in an operating commercial nuclear reactor core.

For example, it is known that Molybdenum-98 may be converted into Molybdenum-99 having a half-life of approximately 2.7 days when exposed to a particular amount of neutron flux. In turn, Molybdenum-99 decays to Technetium-99m having a half-life of approximately 6 hours. Technetium-99m has several specialized medical uses, including medical imaging and cancer diagnosis, and a short-term half-life. Using irradiation targets 122 fabricated from Molybdnenum-98 and exposed to a neutron flux in an operating reactor based on the size of irradiation target 122, Molybdenum-99 and/or Technetium-99m may be generated and harvested in example embodiment assemblies and methods by determining the mass of the irradiation target containing Mo-98, the axial position of the target in the operational nuclear core, the axial profile of the operational nuclear core, and the amount of time of exposure of the irradiation target. Further, because both Mo-98 and Tc-99m are solids, example targets may be fabricated entirely of Mo-98 or natural Molybdenum without need for additional containment, as may be required for liquid or gaseous targets and daughter products. Other solid target/daughter pairs may also take advantage of not needing additional containment and permitting maximum target/daughter mass, including, for example, Iridium/Platinum.

Figure 8:
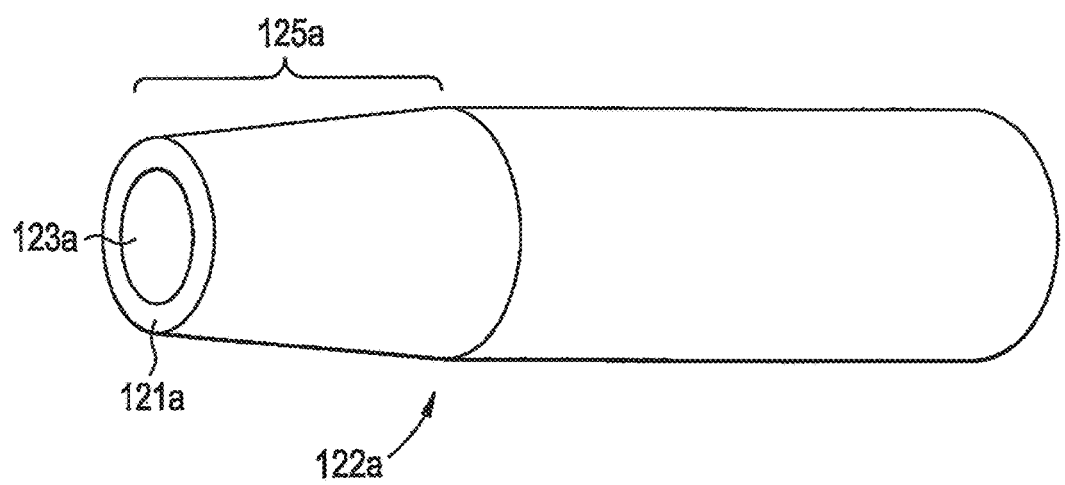
FIG. 8 is an illustration of an example embodiment irradiation target.

FIG. 8 is an illustration of example embodiment irradiation target 122a. Example irradiation target 122a has dimensions that enable it to be inserted into instrumentation tubes 50 (FIG. 1) used in conventional nuclear reactors and/or through any tubing used in delivery systems. For example, irradiation target 122a may have a maximum outer diameter of an inch or less. Similarly, irradiation target 122a may have a maximum outer diameter/perimeter substantially equal to that of other irradiation targets 122b and 122c, so as to provide target portion 120 (FIG. 7) with a constant maximum outer diameter/perimeter. Example embodiment irradiation target 122a may be cylindrical; alternatively, example irradiation target 122a may be a variety of properly-dimensioned shapes, including spheres, hexahedrons, cones, and/or prismatic shapes.

Example embodiment irradiation target 122a includes a hole 123a and a tapering portion 125a. Hole 123a passes through irradiation target 122a and has a position and diameter that permit wire 124 (FIG. 7) or another joining mechanism of example retention devices to pass through and hold irradiation target 122a. Hole 123a may be sized to permit example embodiment irradiation target 122a to freely slide on captured wire 124 or to frictionally join to captured wire 124 in a static position.

Tapering portion 125a is positioned at a front end of example embodiment irradiation target 122a with respect to target portion 120 (FIG. 7). Tapering portion 125a may be smooth and taper at a desired angle, to or short of hole 123a, so as to provide a wedge-shaped leading edge of target portion 120. Tapering portion 125a is shaped and positioned at a leading end of target portion 120 to permit easier navigation of target portion 120 through tubing in example delivery systems and instrumentation tubes 50. Tapering portion 125a may reduce or prevent snagging or pinching in tubing and instrumentation tubes 50 as target portion 120 is advanced therethrough.

Example embodiment irradiation target 122a may further include one or more rounded or chamfered edges 121a. Edges 121a may be rounded, chamfered, or otherwise made smooth at any point where an edge or protrusion may snag or rub against exterior tubing or an instrumentation tube 50, such as in tighter bends of tubing in example delivery devices. Example embodiment irradiation target 122a may have an overall length that further facilitates movement through bends of tubing in example delivery devices and/or instrumentation tubes 50. For example, target 122a may have a total length of approximately ½-1 inches in order to move through bends without becoming caught.

As shown in FIG. 7, example embodiment irradiation target 122a may be positioned at a leading end of wire 124. In order to maintain taper 125a at the leading end and facilitate movement of target portion 120 through any tubing and instrumentation tube 50, example embodiment irradiation target 122a may be joined statically to wire 124 at this position by, for example, having hole 123a capture and frictionally prevent movement of irradiation target 122a relative to wire 124. Alternatively, example embodiment irradiation target 122a may be joined to other irradiation targets 122b/c and/or to driving portion 110 to maintain the taper 125a at a leading edge of target portion 120. Still further, as discussed below, alternate mechanisms for securing example embodiment irradiation target 122a may be used to maintain taper 125a at a leading edge of target portion 120.

Figure 9:
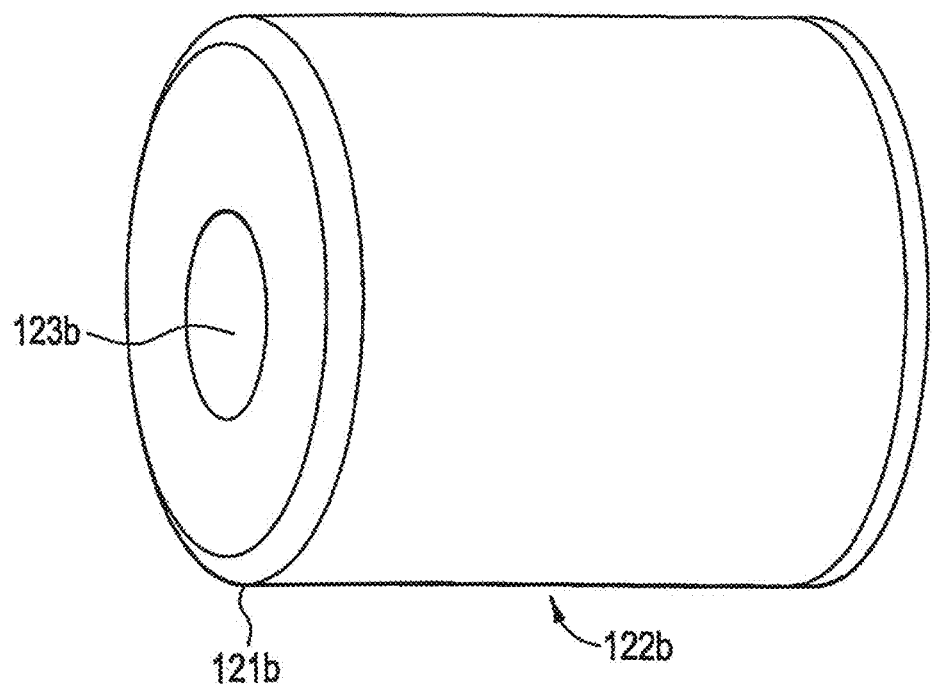
FIG. 9 is an illustration of another example embodiment irradiation target.

FIG. 9 is an illustration of an example embodiment irradiation target 122b. Example target 122b has dimensions that enable it to be inserted into instrumentation tubes 50 (FIG. 1) used in conventional nuclear reactors and/or through any tubing used in delivery systems. For example, irradiation target 122b may have a maximum outer diameter of 0.3 inches or less. Similarly, irradiation target 122b may have a maximum outer diameter/perimeter substantially equal to that of other irradiation targets 122a and 122c, so as to provide target portion 120 (FIG. 7) with a constant maximum outer diameter/perimeter. Example embodiment irradiation target 122b may be cylindrical; alternatively, example irradiation target 122b may be a variety of properly-dimensioned shapes, including spheres, hexahedrons, cones, and/or prismatic shapes.

Example embodiment irradiation target 122b may further include one or more rounded or chamfered edges 121b. Edges 121b may be rounded, chamfered, or otherwise made smooth at any point where an edge or protrusion may snag or rub against exterior tubing or an instrumentation tube 50, such as in tighter bends of tubing in example delivery devices. Example embodiment irradiation target 122b may have an overall length that further facilitates movement through bends of tubing in example delivery devices and/or instrumentation tubes. For example, target 122b may have a total length of approximately ½-1 inches in order to move through bends without becoming caught.

Example embodiment irradiation target 122b includes a hole 123b. Hole 123b passes through irradiation target 122b and has a position and diameter that permit wire 124 (FIG. 7) or another joining mechanism of example retention devices to pass through and hold irradiation target 122b. Hole 123b may be sized to permit example embodiment irradiation target 122b to freely slide on captured wire 124 or to frictionally join to captured wire 124 in a static position.

Figure 10:
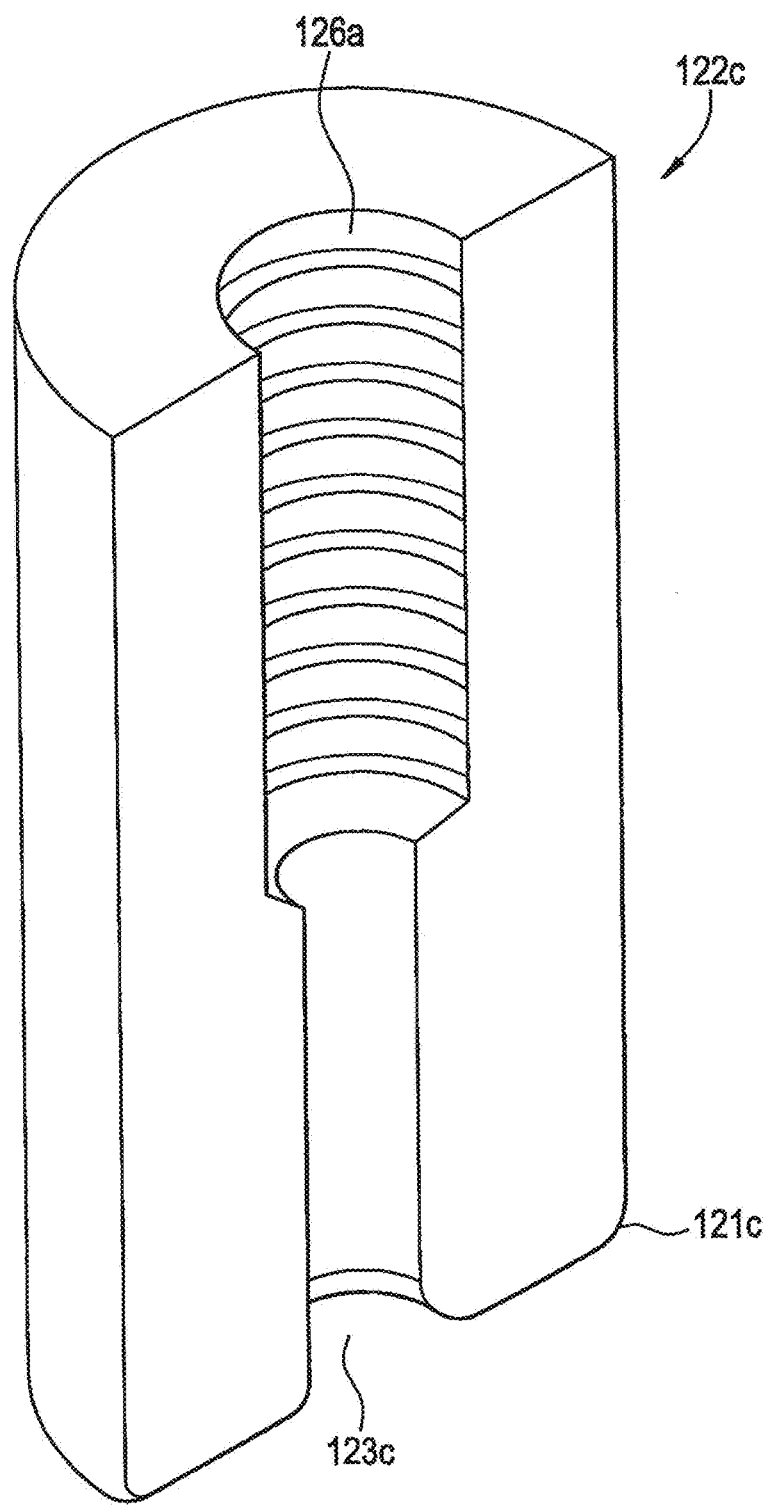
FIG. 10 is an illustration of another example embodiment irradiation target.

FIG. 10 is an illustration of an example embodiment irradiation target 122c. Example irradiation target 122c has dimensions that enable it to be inserted into instrumentation tubes 50 (FIG. 1) used in conventional nuclear reactors and/or through any tubing used in delivery systems. For example, irradiation target 122c may have a maximum outer diameter of a about 0.3 inches or less. Similarly, irradiation target 122c may have a maximum outer diameter/perimeter substantially equal to that of other irradiation targets 122a and 122b, or first end cap 126, so as to provide target portion 120 (FIG. 7) with a constant maximum outer diameter/perimeter. Example embodiment irradiation target 122c may be cylindrical; alternatively, example irradiation target 122c may be a variety of properly-dimensioned shapes, including spheres, hexahedrons, cones, and/or prismatic shapes.

Example embodiment irradiation target 122c may further include one or more rounded or chamfered edges 121c. Edges 121c may be rounded, chamfered, or otherwise made smooth at any point to prevent or reduce the likelihood that an edge or protrusion may snag or rub against exterior tubing or an instrumentation tube 50, such as in tighter bends of tubing in example delivery devices. Example embodiment irradiation target 122c may have an overall length that further facilitates movement through bends of tubing in example delivery devices and/or instrumentation tubes 50. For example, target 122c may have a total length of approximately ½-1 inches in order to move through bends without becoming caught.

Example embodiment irradiation target 122c includes a hole 123b. Hole 123c may pass through target 122b and has a position and diameter that permit wire 124 (FIG. 7) or another joining mechanism of example retention devices to pass through and hold irradiation target 122b. Example embodiment irradiation target 122c may further include internal threads 126a or other joining mechanism that permits target 122c to be connected to driving portion 110 (FIG. 3). Further, wire 124 may originate and be anchored in hole 123c, such that when target 122c is joined to driving portion 110 via internal threads 126a or other joining mechanisms, such as adhesives, welding, external fasteners, etc., irradiation target 122c may anchor target portion 120 to driving portion 110 of example delivery systems. If wire 124 itself is fabricated from irradiation target material, then the entire target portion including example targets 122a, b, and c and wire 124 may be disconnected from driving portion 110 and harvested once irradiated and converted to desired daughter products.

As shown in FIG. 7, one or more example embodiment irradiation targets 122a/b/c may be strung on wire 124. While example embodiments have been shown and described in FIG. 7 as having target 122a at a leading edge, one or more targets 122b in a middle portion, and target 122c joined to a driving portion 110 at a trailing edge in order to facilitate reduced snag and friction in insertion and removal of irradiation targets 122 through tubing and instrumentation tubes 50 and maximize desired daughter product production and harvesting, it is understood that other orders, combinations, and inclusion of additional structures among example embodiment irradiation targets 122/a/b/c are all equally possible.

Example embodiment irradiation targets 122 a/b/c are shown strung on wire 124 in order to preserve their position in target portion 120. It is understood that several other alternate joining mechanisms may be implemented to secure a position and/or order of example embodiment targets 122. For example, holes 123a/b/c shown in example embodiment irradiation targets 122 a/b/c may be internally threaded by internal threads 126a or have other internal configurations that permit wire 124 to join to and/or be moved through irradiation targets 122 a/b/c. Or for example, example targets 122a/b/c may be held together by an adhesive resin configured to maintain its adhesive properties when exposed to conditions in an instrumentation tube 50 of an operating nuclear reactor.

Figure 11:
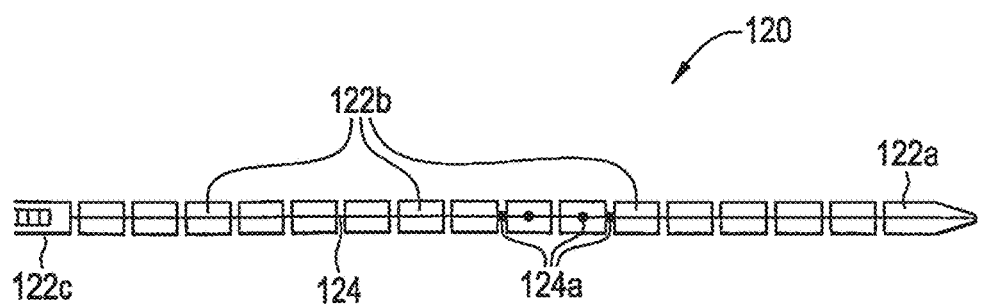
FIG. 11 is an illustration of several example embodiment irradiation targets combined with an alternate example delivery system.

As shown in FIG. 11, wire 124 may further include one or more holding points 124a. Holding points 124a may include washers or knots in wire 124 expanding the cross section of wire 124 at holding points 124a. Example embodiment irradiation targets 122a/b/c may further have enlarged portions of holes 123/a/b/c that permit holding points 124a to be captured within example embodiment irradiation targets 122 a/b/c so as to hold irradiation targets 122a/b/c stationary with respect to wire 124. Holding points 124a may be positioned between irradiation targets 122a/b/c in order to hold irradiation targets 122 a/b/c stationary with respect to wire 124.

In this way, one or more irradiation targets 122 may be placed in/joined to a delivery system, such as the ones illustrated in FIGS. 2-6, and successfully delivered in an instrumentation tube 50 in order to be irradiated. Example embodiment irradiation targets 122 may permit several different types of irradiation targets 122 to be placed in instrumentation tubes 50. Because several example targets 122 may be placed at precise axial levels within an instrumentation tube 50, it may be possible to provide a more exact amount/type of irradiation target 122 at a particular axial level within instrumentation tube 50. Because the axial flux profile may be known in the operating reactor, this may provide for more precise generation and measurement of useful radioisotopes in irradiation targets 122 placed within example embodiment irradiation target retention apparatuses. Several different radioisotopes may be generated in example embodiments and example methods. Example embodiments and example methods may have a particular advantage in that they permit generation and harvesting of short-term radioisotopes in a relatively fast timescale compared to the half-lives of the produced radioisotopes, without shutting down a commercial reactor, a potentially costly process, and without hazardous and lengthy isotopic and/or chemical extraction processes. Although short-term radioisotopes having diagnostic and/or therapeutic applications are producible with example apparatuses and methods, radioisotopes having industrial applications and/or long-lived half-lives may also be generated.

Example embodiments thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A method of producing isotopes in a nuclear reactor with an irradiation target delivery system, the method comprising:
   placing at least one irradiation target into an irradiation target delivery device, the irradiation target configured to substantially convert to a different daughter product when exposed to a neutron flux in the operating nuclear reactor, the irradiation target including a first irradiation target positioned at a leading end of a target portion of the irradiation target delivery device, the first irradiation target having an end that tapers to the leading edge;
   inserting the irradiation target delivery device into an instrumentation tube of a nuclear reactor via a drive system that drives the irradiation target delivery device into the instrumentation tube;
   irradiating the at least one irradiation target;
   removing the irradiation target delivery device from the nuclear reactor; and
   harvesting the daughter product from the irradiation target.

2. The method of claim 1, wherein the placing the at least one irradiation target into the irradiation target delivery device includes attaching the irradiation target to a wire, and pushing the wire through a first guide and into the instrumentation tube using the drive system.

3. The method of claim 1, wherein the at least one irradiation target further includes a second irradiation target positioned behind the first irradiation target from the leading end, the second irradiation target configured to removably join to a driving portion of the delivery device.

4. The method of claim 3, wherein the at least one irradiation target further includes at least one third irradiation target positioned between the first and the second irradiation targets, and wherein the first, the second, and the third irradiation targets are cylindrical and have a substantially similar outer diameter.

5. The method of claim 2, wherein,
   the placing of the at least one irradiation target into the irradiation target delivery device includes,
      pushing the wire through the first guide and into a loading area,
      placing the at least one irradiation target into the irradiation target delivery device in the loading area,
      pulling the wire back out of the first guide,
   the inserting of the irradiation target delivery device into the instrumentation tube includes,
      pushing the wire back through the first guide and into the instrumentation tube after the at least one irradiation target is in the irradiation target delivery device.

6. The method of claim 5, further comprising:
   selecting between at least two positions on the first guide, a first position of the first guide allowing the wire to travel between the first guide and the loading area, and a second position of the first guide allowing the wire to travel between the first guide and the instrumentation tube.

7. The method of claim 5, wherein the inserting of the irradiation target delivery device into the instrumentation tube further includes,
   pushing the irradiation target delivery device through a second guide located downstream of the first guide,
   selecting between at least two positions on the second guide, a first position of the second guide allowing the wire to travel between the second guide and the instrumentation tube, and a second position allowing a second drive system to drive a cable between the second guide and the instrumentation tube while impeding the wire from traveling between the second guide and the instrumentation tube.

8. the method of claim 7, wherein,
   tubing segments exist between the drive system and the first guide, the first guide and the second guide, and the second guide and the instrumentation tube,
   the inserting of the irradiation target delivery device into the instrumentation tube further includes,
      pushing the irradiation target delivery device through the tubing segments using the drive system.

* * * * *